United States Patent
Shibuya et al.

[19]

[11] Patent Number: 6,051,896
[45] Date of Patent: Apr. 18, 2000

[54] MOLDING MACHINE

[75] Inventors: Hiroshi Shibuya; Satoshi Nishida; Tokuzou Sekiyama; Satoru Matsubara, all of Gunma; Atsushi Koide, Nagano, all of Japan

[73] Assignees: Nissei Plastic Industrial Co. Ltd, Nagano-Ken; Misso Electric Company, Gunma-Pref, both of Japan

[21] Appl. No.: 09/300,510

[22] Filed: Apr. 28, 1999

[30] Foreign Application Priority Data

May 1, 1998 [JP] Japan .................................. 10-122229

[51] Int. Cl.[7] .................................................. H02K 41/00
[52] U.S. Cl. .............................. 310/12; 310/13; 310/14; 310/152; 310/156; 425/3; 335/281
[58] Field of Search .............................. 310/12, 13, 14, 310/152, 156, 15; 425/3; 174.8 R, DIG. 33; 335/281, 220, 255

[56] References Cited

U.S. PATENT DOCUMENTS

| | | | |
|---|---|---|---|
| 4,133,460 | 1/1979 | Jerpbak | 222/386 |
| 4,152,570 | 5/1979 | Inoue et al. | 310/12 |
| 4,242,606 | 12/1980 | Nonnenmann | 310/12 |
| 4,511,319 | 4/1985 | Takayama | 425/145 |
| 4,565,116 | 1/1986 | Hehl | 91/519 |
| 4,669,013 | 5/1987 | Scranton et al. | 310/13 |
| 5,443,587 | 8/1995 | Takizawa | 425/145 |
| 5,470,592 | 11/1995 | Steger | 425/3 |
| 5,472,657 | 12/1995 | Watanabe et al. | 264/328.1 |
| 5,661,446 | 8/1997 | Anderson et al. | 310/13 |
| 5,792,396 | 8/1998 | Takizawa | 264/40.5 |
| 5,868,978 | 2/1999 | Kadoriku et al. | 264/40.5 |
| 5,897,815 | 4/1999 | Quichaud et al. | 264/28 |

FOREIGN PATENT DOCUMENTS 9-11290  1/1997  Japan .

*Primary Examiner*—Nestor Ramirez
*Assistant Examiner*—Saeed Ghahramani
*Attorney, Agent, or Firm*—Birch, Stewart, Kolasch & Birch, LLP

[57] ABSTRACT

A molding machine includes a drive unit for rotating and linearly moving a movable body. The drive unit includes a linear motor and a rotary motor. The linear motor includes a linear movement body having moving-side magnetic-pole portions and supported in an axially movable manner and a stationary body having stationary-side magnetic-pole portions adapted to linearly move the linear movement body. The linear movement body has moving-side inclined surfaces on which part of the moving-side magnetic-pole portions are disposed. The stationary body has stationary-side inclined surfaces which face the moving-side inclined surfaces and on which part of the stationary-side magnetic-pole portions are disposed. The rotary motor is incorporated into the linear movement body and is adapted to rotate an output shaft connected to the movable body.

13 Claims, 11 Drawing Sheets

MOLDING MACHINE

BACKGROUND OF THE INVENTION

1. Field of the Invention

The present invention relates to a molding machine equipped with a drive unit for rotating and linearly moving a movable body, such as a screw.

2. Description of the Relevant Art

An in-line screw injection molding machine equipped with a motor drive unit for rotating and linearly moving a screw is disclosed in, for example, Japanese Patent Application Laid-Open (kokai) No. 9 (1997)-11290.

Such an injection molding machine includes a measurement-related drive section, which employs a first servomotor and is adapted to rotate a screw, and an injection-related drive section, which employs a second servomotor and is adapted to linearly move the screw. In a measuring step, the measurement-related drive section causes the screw to rotate, thereby plasticizing and measuring a molding material. In an injection step, the injection-related drive section causes the screw to advance, thereby injecting and charging the measured resin into a mold. Many molding machines employ a drive unit for driving a movable body, such as a screw, in two different operation modes as mentioned above.

However, since such a drive unit employs independent drive mechanisms corresponding to different drive sections. Further, the drive mechanisms each include a servomotor, a transmission mechanism, a reduction mechanism, and a motion conversion mechanism (e.g. ball screw mechanism) for converting a rotational motion to a linear motion. As a result, due to an increase in the number of components, the overall structure of an injection molding machine becomes complicated and increases in size, resulting in an impairment in reliability and a great increase in overall cost.

SUMMARY OF THE INVENTION

An object of the present invention is to provide a molding machine capable of reducing the number of components and implementing a simpler, more compact structure.

Another object of the present invention is to provide a molding machine capable of improving reliability and achieving great cost reduction.

To achieve the above objects, a molding machine of the present invention comprises a drive unit for rotating and linearly moving a movable body. The drive unit comprises a linear motor and a rotary motor. The linear motor comprises a linear movement body having a moving-side magnetic-pole portion and supported in an axially movable manner, and a stationary body having a stationary-side magnetic-pole portion adapted to linearly move the linear movement body. The linear movement body has a moving-side inclined surface on which part of the moving-side magnetic-pole portion is disposed. The stationary body has a stationary-side inclined surface which faces the moving-side inclined surface and on which part of the stationary-side magnetic-pole portion is disposed. The rotary motor is incorporated into the linear movement body and is adapted to rotate an output shaft connected to the movable body.

For example, in an injection molding machine, the output shaft of the thus-configured drive unit is connected to a screw housed within an injection apparatus. In a measuring step, the rotary motor is driven so as to rotate the screw via the output shaft, thereby plasticizing and measuring a molding material. In an injection step, the linear motor is driven so as to linearly move the linear movement body, thereby advancing the screw via the output shaft. In a speed control zone where injection and charge performed, speed control of the linear movement body (screw) is performed primarily by the moving-side magnetic-pole portion of the linear movement body excluding the moving-side inclined surface and the stationary-side magnetic-pole portion of the stationary body excluding the stationary-side inclined surface. In a pressure control zone where pressure is held, pressure control of the linear movement body (screw) is performed primarily by the moving-side magnetic-pole portion of the moving-side inclined surface and the stationary-side magnetic-pole portion of the stationary-side inclined surface.

DETAILED DESCRIPTION OF THE PREFERRED EMBODIMENTS

Embodiments of the present invention will next be described in detail with reference to the drawings. The accompanying drawings are illustrative of the embodiments and are not meant to limit the scope of the invention. In order to clarify the invention, detailed description of known parts is omitted.

A molding machine according to a first embodiment, i.e., an in-line screw injection molding machine M, will be described with reference to FIGS. 1 to 8.

Figure 1:
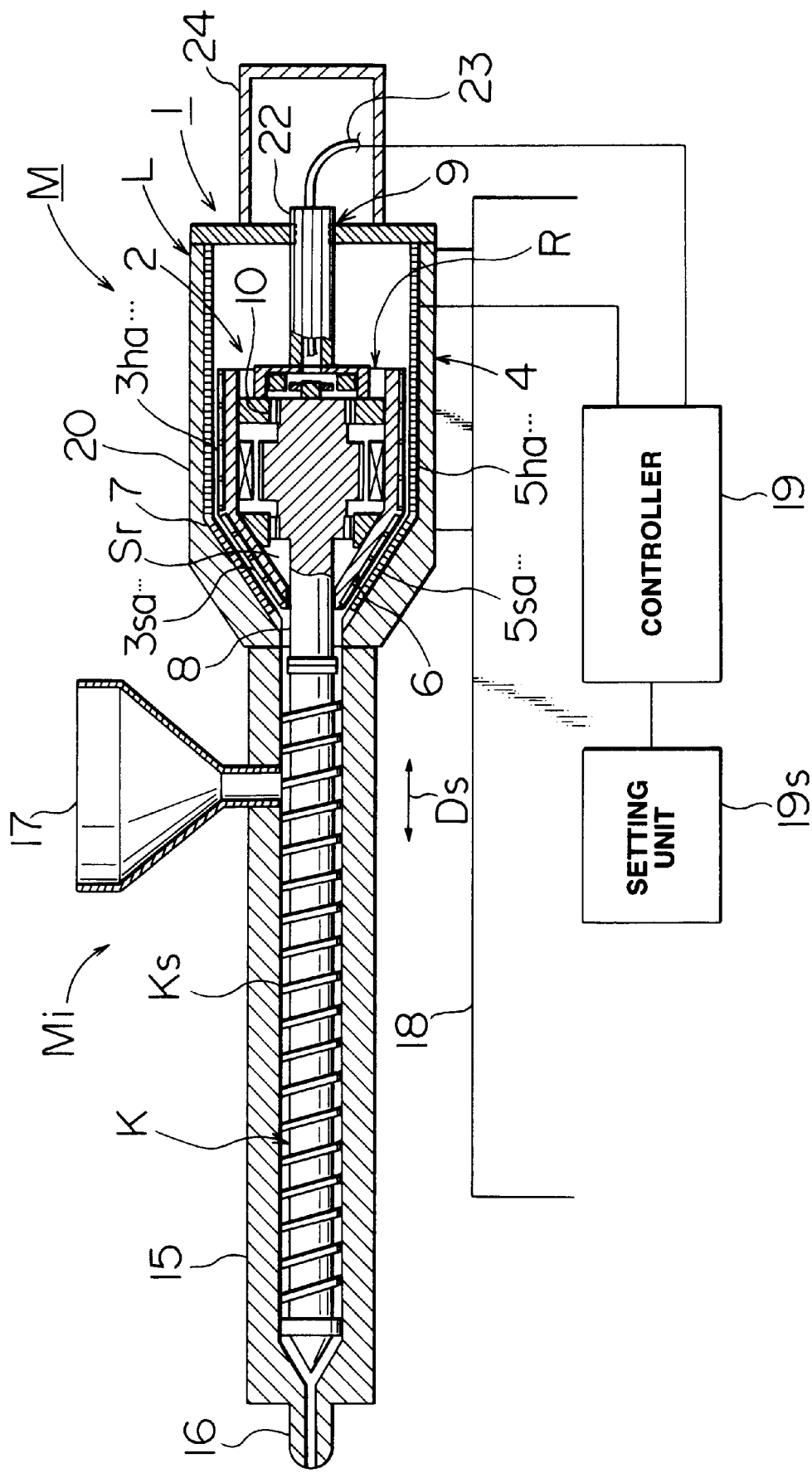
FIG. 1 is a schematic view showing an in-line screw injection molding machine according to an embodiment of the present invention.

FIG. 1 shows an injection apparatus Mi of the in-line screw injection molding machine M. The injection apparatus Mi includes a heating cylinder 15 having an injection nozzle 16 located at the tip thereof and a hopper 17 located at a rear (right-hand side in FIG. 1) portion. A screw Ks (movable body K) is inserted into the heating cylinder 15 such that it can undergo rotation and reciprocating motion therein. A drive unit 1 is provided at the rear end of the heating cylinder 15. An output shaft 8 of the drive unit 1 is connected to the rear end of the screw Ks. Reference numeral 18 denotes a machine base for supporting the injection apparatus Mi.

The drive unit 1 will next be described in detail with reference to FIGS. 2 to 8. The drive unit 1 integrally includes a rotary motor R for rotating the screw Ks and a linear motor L for linearly moving the screw Ks.

The linear motor L functions as a three-phase AC servomotor and includes a linear movement body 2 supported such that it can move in axial direction Ds, and a stationary body 4 adapted to linearly move the linear movement body 2. The stationary body 4 includes a casing 20. The casing 20 assumes a tubular shape of square cross section, and a front (left-hand side in FIG. 1) portion thereof is reduced in size toward its front end to form a tetragonal pyramid. A rear cover 21 is attached to the rear end face of the casing 20. A spindle 22 projects rearward from a central portion of the rear end of the linear movement body 2 and is spline-connected to the rear cover 21 at the center thereof such that it can slide in axial direction Ds, thereby forming a rotation-restricting mechanism 9 for restricting rotation of the linear movement body 2. The spindle 22 assumes a tubular form to allow cables 23 to run therethrough as shown in FIG. 1. Reference numeral 24 in FIG. 1 denotes a protection cover which covers the spindle 22.

An armature portion 25 including stationary-side magnetic-pole portions 5sa, 5sb, 5sc, . . . , 5ha, 5hb, 5hc, . . . is provided on the interior upper (upper side in FIG. 2) surface of the casing 20. A front portion of the interior upper surface of the casing 20 forms a stationary-side inclined surface 7, and the remaining portion of the interior upper surface of the casing 20 forms a stationary-side parallel surface 26. The stationary-side magnetic-pole portions 5sa, 5sb, 5sc . . . are arranged on the stationary-side inclined surface 7, whereas the remaining stationary-side magnetic-pole portions 5ha, 5hb, 5hc, . . . are arranged on the stationary-side parallel surface 26. An armature portion 27 is also similarly configured on the interior lower (lower side in FIG. 2) surface of the casing 20. A configuration of the lower armature portion 27 is the mirror image of the above-described configuration of the upper armature portion 25.

Figure 2:
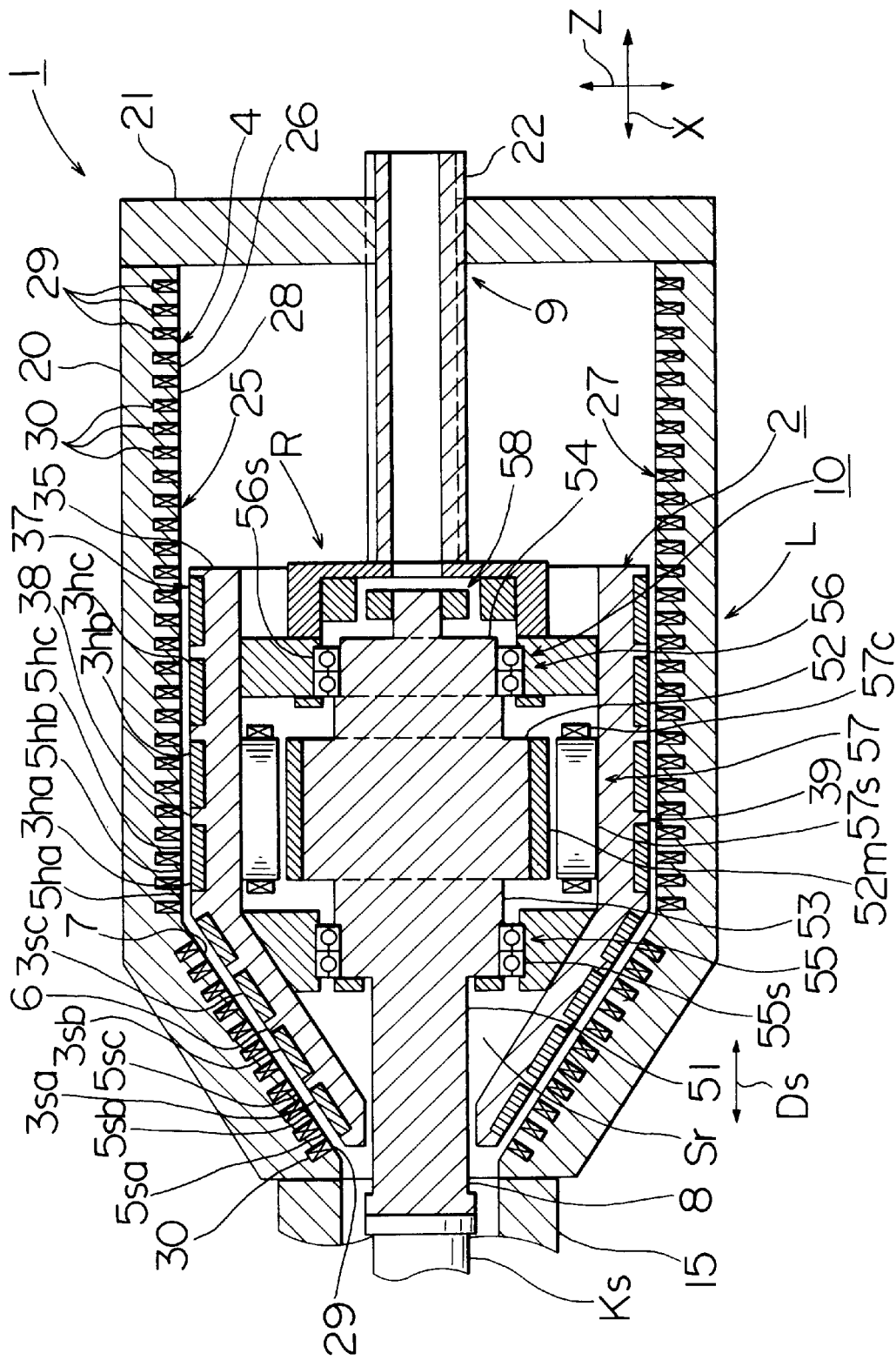
FIG. 2 is a sectional side view of a drive unit provided on the molding machine of FIG. 1.
Figure 3:
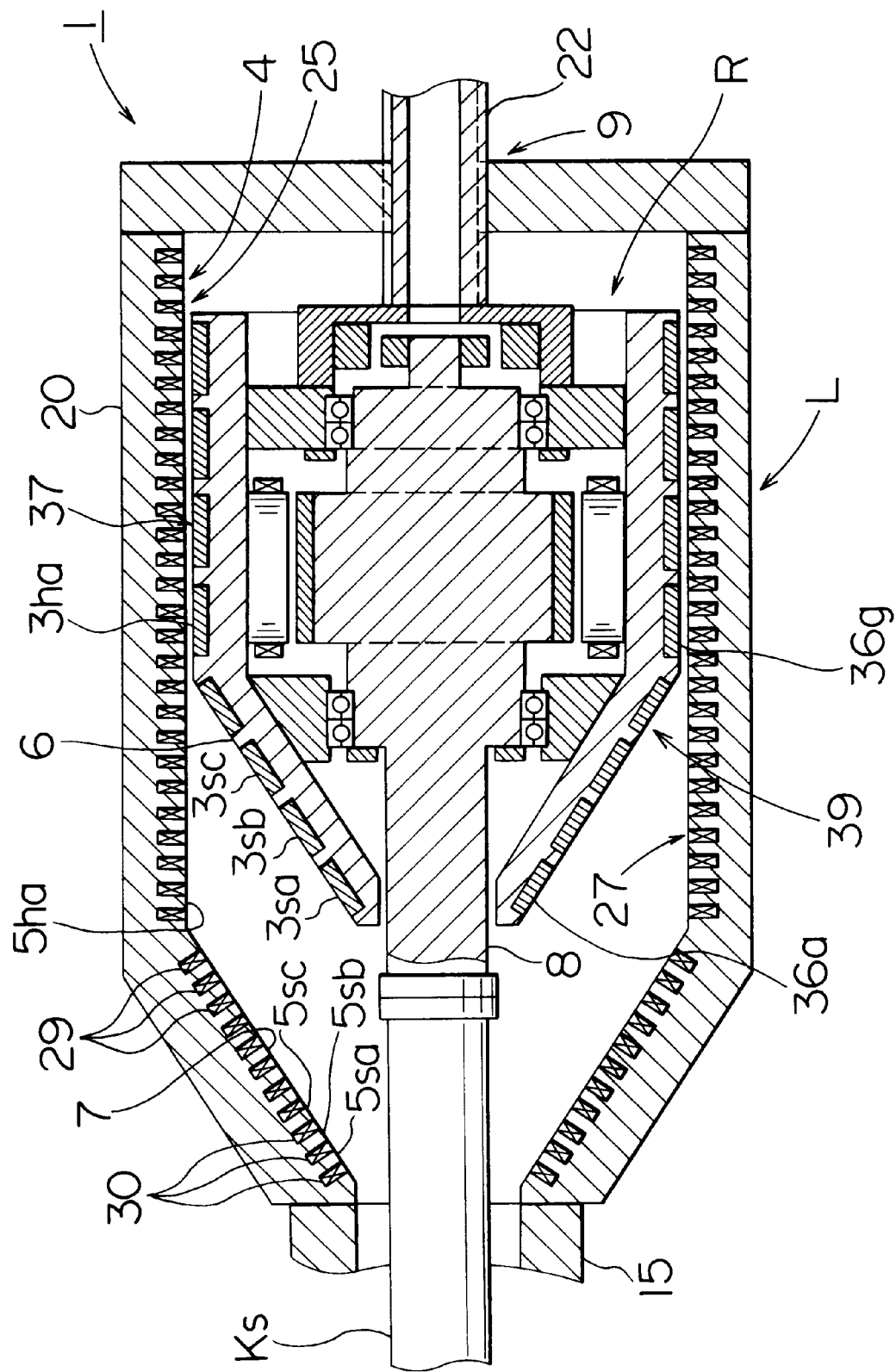
FIG. 3 is a sectional side view of the drive unit of FIG. 2 in which a linear movement body is situated at a position different from that of FIG. 2.
Figure 5:
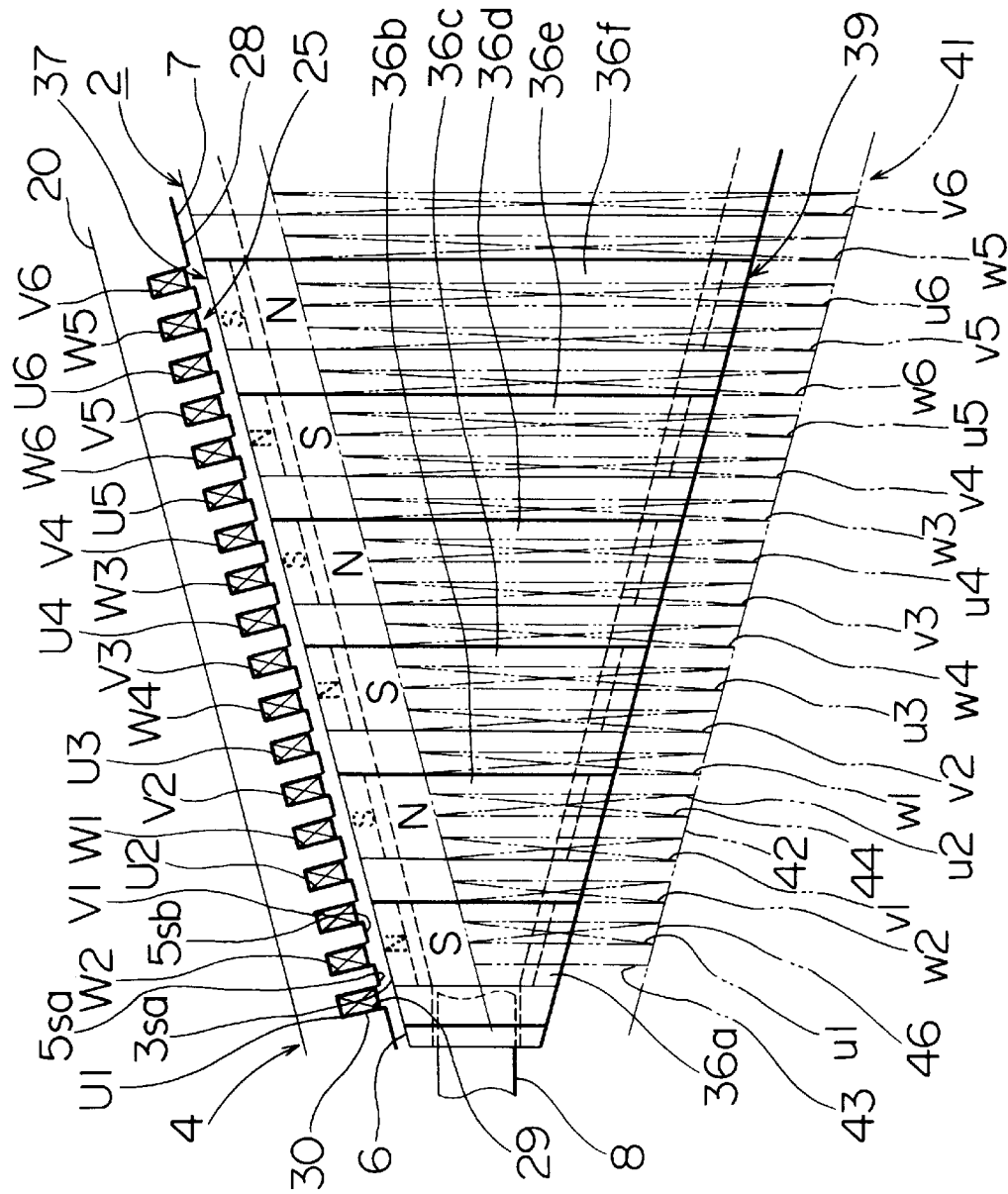
FIG. 5 is a left-hand side view showing a front portion of the linear movement body of the molding machine of FIG. 1 and a front portion of the stationary body of the molding machine of FIG. 1 represented partially by an imaginary line.

The specific configuration of the armature portion 25 is next described. A plurality of comb-shaped silicon steel plates are superposed in direction Y (FIG. 2) to form a laminated armature core 28. A front portion of the interior surface of the armature core 28 forms the stationary-side inclined surface 7 described above. A total of 18 slots 29 are formed in the stationary-side inclined surface 7 at predetermined intervals in axial direction Ds (direction X), and many slots 29 are similarly formed in the stationary-side parallel surface 26. The number of slots 29 is selected according to the specific application. FIGS. 1 to 3 schematically show a number of slots 29. Three-phase (U phase, V phase, and W phase) armature coils 30 are wound in the corresponding slots 29 formed in the armature core 28. The armature coils 30 each include a U-phase armature coil, a V-phase armature coil, and a W-phase armature coil, each being shifted by an electrical angle of 120°. Specifically, as shown in FIG. 5, the first U-phase armature coil is wound from slot U1 toward slot U2: the second U-phase armature coil is wound from slot U3 toward slot U4; and the third U-phase armature coil is wound from slot U5 toward slot U6. The first V-phase armature coil is wound from slot V1 toward slot V2; the second V-phase armature coil is wound from slot V3 toward slot V4; and the third V-phase armature coil is wound from slot V5 toward slot V6. The first W-phase armature coil is wound from slot W1 toward slot W2; the second W-phase armature coil is wound from slot W3 toward slot W4; and the third W-phase armature coil is wound from slot W5 toward slot W6. FIG. 5 shows only the stationary-side inclined surface 7, but the stationary-side parallel surface 26 and the armature portion 27 are configured similarly.

The linear movement body 2 includes a housing 35 that assumes a tubular shape of square cross section. A front portion of the housing 35 is reduced in size toward its front end to form a tetragonal pyramid. Magnetic elements 36a to 36f, 36g . . . are arranged at predetermined intervals on the outer surface of the linear movement body 2 and are magnetically isolated from each other by the housing 36 of non-magnetic material. Each of the magnetic elements 36a . . . is formed in a rectangular frame shape. Thus, a field pole portion 37 is formed on the outer upper surface of the housing 35. Moving-side magnetic-pole portions 3sa, 3sb, 3sc, . . . , 3ha, 3hb, 3hc . . . are generated in the field pole portion 37. A front portion of the outer upper surface of the housing 35 forms a moving-side inclined surface 6, and the remaining portion of the outer upper surface of the housing 35 forms a moving-side parallel surface 38. The moving-side inclined surface 6 faces the stationary-side inclined surface 7, and the moving-side parallel surface 38 faces the stationary-side parallel surface 26. The moving-side magnetic-pole portions 3sa, 3sb, 3sc . . . are arranged on the moving-side inclined surface 6, whereas the remaining moving-side magnetic-pole portions 3ha, 3hb, 3hc, . . . are arranged on the moving-side parallel surface 38. A field pole portion 39 is similarly configured on the outer lower surface of the housing 35. A configuration of the lower field pole portion 39 is the mirror image of the above-described configuration of the upper field pole portion 37.

A field-generating portion 41 is provided on the interior left-hand surface of the casing 20. The field-generating portion 41 is adapted to magnetize the magnetic elements 36a to 36f, 36g . . . so as to generate the moving-side magnetic-pole portions 3sa, 3sb, 3sc, . . . , 3ha, 3hb, 3hc, . . . A plurality of comb-shaped silicon steel plates are superposed in direction Z (FIG. 2) to form a laminated field core 42. A front portion of the interior surface of the field core 42 forms a stationary-side inclined surface 43, and the remaining portion of the interior surface of the field core 42 forms a stationary-side parallel surface 45. A total of 18 slots 44 are formed in the stationary-side inclined surface 43 at predetermined intervals in axial direction Ds, and many slots 44 are similarly formed in the stationary-side parallel surface 45. The number of slots 44 is selected according to specifications of application. Three-phase (u phase, v phase, and w phase) field coils 46 are wound in the corresponding slots 44 formed in the field core 42. The field coils 46 each include a u-phase armature coil, a v-phase armature coil, and a w-phase armature coil, each being shifted by an electrical angle of 120°. Specifically, the first u-phase field coil is wound from slot u1 toward slot u2; the second u-phase field coil is wound from slot u3 toward slot u4; and the third u-phase field coil is wound from slot u5 toward slot u6. The first v-phase field coil is wound from slot v1 toward slot v2: the second v-phase field coil is wound from slot v3 toward slot v4; and the third v-phase field coil is wound from slot V5 toward slot V6. The first w-phase field coil is wound from slot w1 toward slot w2; the second w-phase field coil is wound from slot w3 toward slot w4; and the third w-phase field coil is wound from slot w5 toward slot w6. The field coils 46 are wound in such a manner as to shift in electrical angle by 90°, or to shift by one slot 44 and half in position along direction X, with respect to the corresponding armature coils 30. In a certain structure of the linear motor L, the angle of shift is not necessarily an exact electrical angle of 90°, but may be an electrical angle near 90°. FIG. 5 shows only the stationary-side inclined surface 43, but the stationary-side parallel surface 45 is configured similarly. A field-generating portion 47 is similarly configured on the interior right-hand surface of the casing 20. A configuration of the right-hand field-generating portion 47 is the mirror image of the above-described configuration of the left-hand field-generating portion 41. As described above, in the linear motor L according to the present embodiment, the field magnetic-pole portions 37 and 39 and the field-generating portions 41 and 47 serve in combination as field portions corresponding to the armature portions 25 and 27.

The principle of operation of the linear motor L will next be described. The operation induced between the moving-side inclined surface 6 and the stationary-side inclined surface 8 will be described with reference to FIGS. 4 and 5. The operation induced between the stationary-side parallel surface 26 and the moving-side parallel surface 38 is basically similar to that induced between the inclined surfaces 6 and 7.

First, alternating currents iu, iv, and iw, which are shifted by a phase angle of 120°, flow through the field coils 46. When im represents a maximum current, iu, iv, and iw are represented as follows: iu=im·sinωt; iv=im·sin(ωt−2 π/3); and iw=im·sin(ωt−4 π/3). As a result of alternating currents iu, iv, and iw flowing through the field coils 46, a north pole for generating magnetic flux Φ directed toward the magnetic element 36a (36c and 36e) of the linear movement body 2 is induced, and a south pole for absorbing magnetic flux Φ directed from the magnetic element 36b (36d and 36f) toward the field-generating portion 41 is induced. In this manner, a relevant magnetic pole emerges in the magnetic elements 36a, 36b, 36c, 36d, . . . The emerging magnetic poles move in axial direction Ds. The same phenomenon also occurs in the field-generating portion 47.

In the magnetic field associated with the magnetic poles (north and south poles) induced by each of the field-generating portions 41 . . . , magnetic flux is distributed in the form of a sine wave along the direction of linear movement. When the maximum magnetic flux is represented by Φm and the magnetic-pole center is located at θ=0, magnetic flux is represented by Φ=Φm·cosθ. By aligning the magnetic-pole center of the magnetic field induced by each of the field coils 46 with the most readily magnetizable surface of the linear movement portion 2, specifically with a central region of each of the magnetic elements 36a to 36f, through control of alternating currents iu, iv, and iw flowing through the field coils 46, the magnetic elements 36a to 36f of the linear movement body 2 are magnetized in a predetermined direction and at a magnetic flux density approximated by B=Bm·cosθ.

Specifically, the magnetic elements 36a to 36f of the linear movement body 2 are magnetized in predetermined directions according to magnetic poles (north and south poles) induced in each of the field-generating portions 41 . . . As a result, the moving-side magnetic-pole portions 3sa, 3sb, 3sc, . . . , 3ha, 3hb, 3hc, . . . are induced on the outer upper surface of the housing 35. For example, as shown in FIG. 5, when alternating currents iu, iv, and iw cause the north pole to be induced in each of the field-generating portions 41 . . . at a region opposite the magnetic element 36a (36c and 36e) and cause the south pole to be induced in each of the field-generating portions 41 . . . at a region opposite the magnetic element 36b (36d and 36f), the magnetic elements 36a to 36f are magnetized in the following manner. The south pole is induced in a surface of the magnetic element 36a (36c and 36e) opposite the corresponding field-generating portion 41 . . . and in a surface of the magnetic element 36b (36d and 36f) opposite the corresponding armature portion 25 . . . Also, the north pole is induced in a surface of the magnetic element 36a (36c and 36e) opposite the corresponding armature portion 25 . . . and in a surface of the magnetic element 36b (36d and 36f) opposite the corresponding field-generating portion 41 . . .

Figure 4:
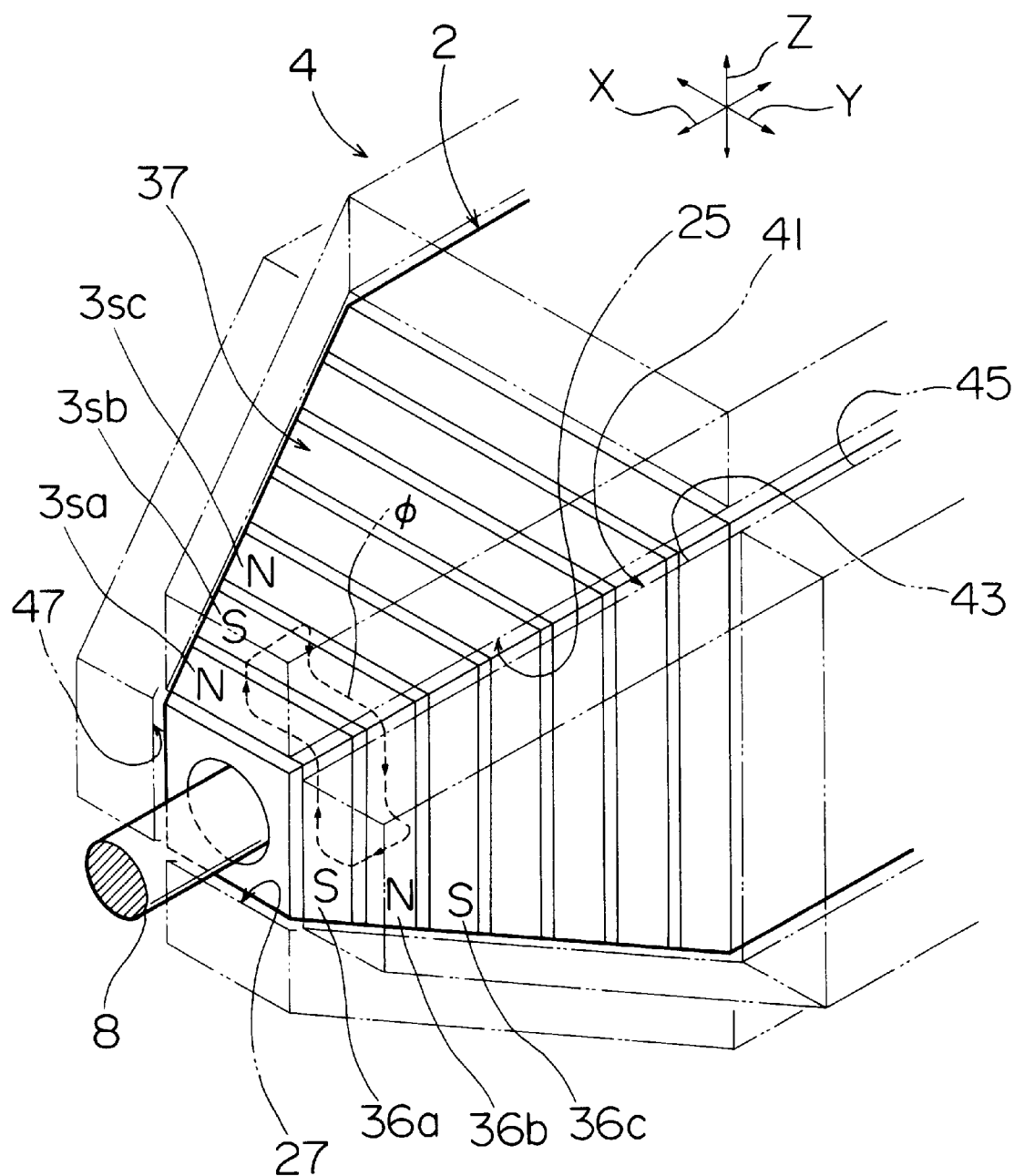
FIG. 4 is a perspective view showing a front portion of the linear movement body of the molding machine of FIG. 1 and a front portion of a stationary body of the molding machine of FIG. 1 represented by an imaginary line.

Further specifically, as shown in FIG. 4, magnetic flux Φ (dotted line) induced from the north-pole region of the field-generating portion 41 passes through the south-pole surface (side surface) of the magnetic element 36a and reaches the interior thereof. The magnetic flux Φ which has reached the interior of the magnetic element 36a passes through the north-pole surface (upper surface) of the magnetic element 36a and reaches the interior of the armature portion 25. The magnetic flux Φ passes through the interior of the armature portion 25 an axial direction Ds and passes through the south-pole surface (upper surface) of the magnetic element 36b, thus reaching the interior of the magnetic element 36b. The magnetic flux Φ which has reached the interior of the magnetic element 36b passes through the north-pole surface (side surface) of the magnetic element 36b and reaches the south-pole region of the field-generating portion 41. FIG. 4 only shows the relationship between the left-hand field-generating portion 41 and the upper armature portion 25. The same relationship is established between the right-hand field-generating portion 47 and the lower armature portion 27. As described above, in the linear motor L, a predetermined closed magnetic circuit is formed by means of the field portions (field-generating portions 41 and 47 and magnetic elements 36a . . . and the armature portions 25 and 27.

Three-phase alternating currents (armature currents) IU, IV, and IW, which are shifted by a phase angle of 120°, flow through the armature coils 30 of each of the armature portions 25 . . . When Im represents a maximum current, IU, IV, and IW are represented as follows: IU=Im·sinωt; IV=Im·sin(ωt−2 π/3); and IW=Im·sin(ωt−4 π/3). Since the armature coils 30 lead the field coils 46 in phase by an electrical angle of about 90°, torque T (thrust) is generated according to Fleming's rule, so that the linear movement body 2 moves in a predetermined direction. The magnitude of torque T can be controlled simply by controlling the magnitude of current flowing through the field coils 46 and the armature coils 30. Notably, armature current also induces magnetic flux. However, since the housing 35 of the linear movement body 2 is non-magnetic, the linear movement body 2 is less likely to be magnetized; i.e., the linear movement body 2 is less affected by the magnetic flux.

Figure 6:
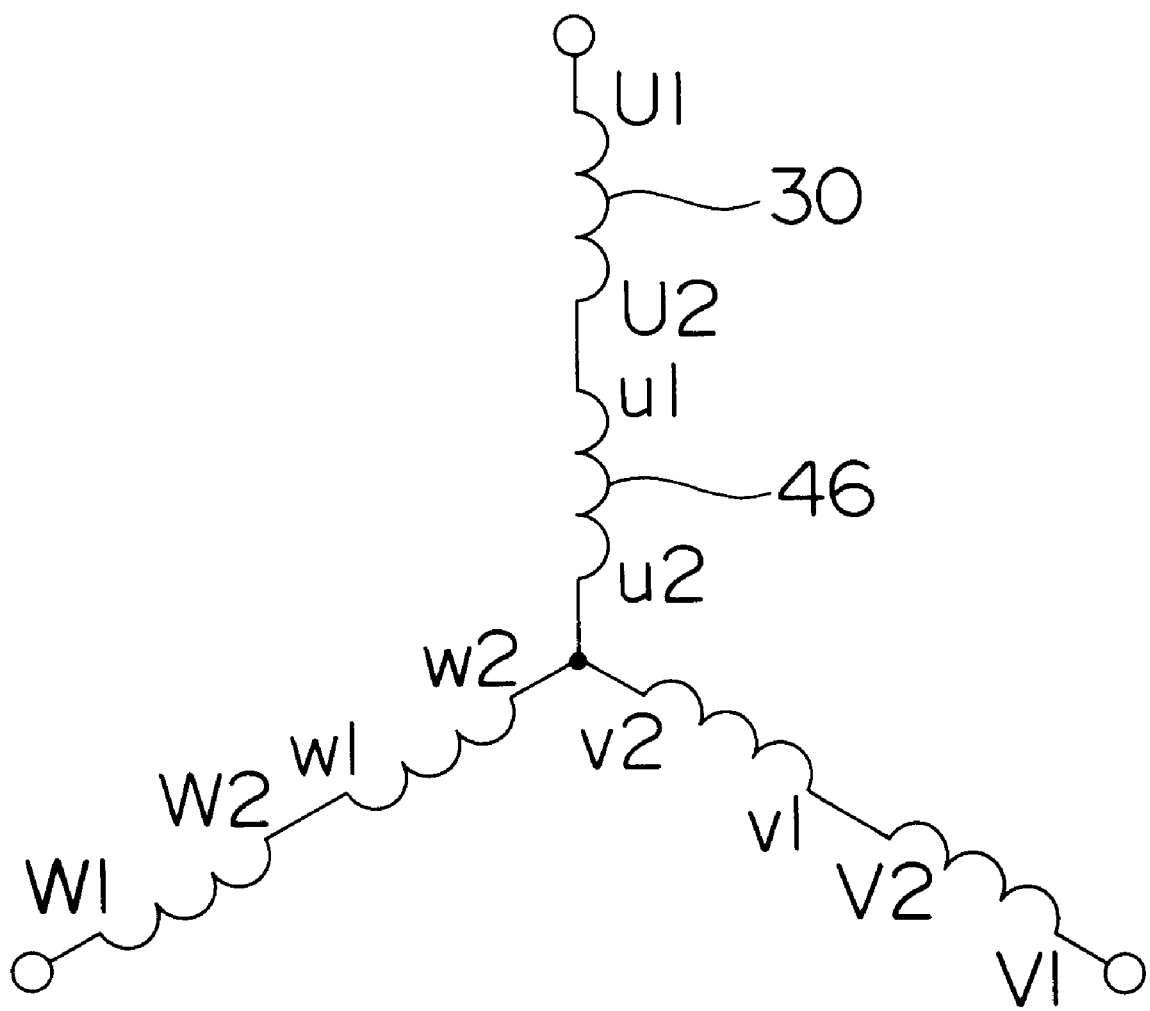
FIG. 6 is a connection diagram of armature coils and field coils in a linear motor of the drive unit of the molding machine of FIG. 1.

FIG. 6 shows how the armature coils 30 and the field coils 46 are connected. When the field coils 46 and the armature coils 30 are mechanically wound such that there exists a phase difference of 90° in the electrical angle therebetween as shown in FIG. 5, the armature coils 30 and the field coils 46 can be series-wound. The drive unit 1, therefore, can be controlled as a series-wound AC motor by a single inverter. In this case, the field coils 46 are provided with additional coils for controlling thrust. By controlling the magnitude of the field current supplied to the field coils 46 of the left-hand field-generating portion 41 and the magnitude of field current supplied to the field coils 46 of the right-hand field-generating portion 47, a desired thrust can be generated. When the field coils 46 and the armature coils 30 are wound in a mechanically separate manner so as to assume the same phase, separate inverters may be provided and may perform control so as to establish a phase difference of 90° between field current and armature current.

Figure 7:
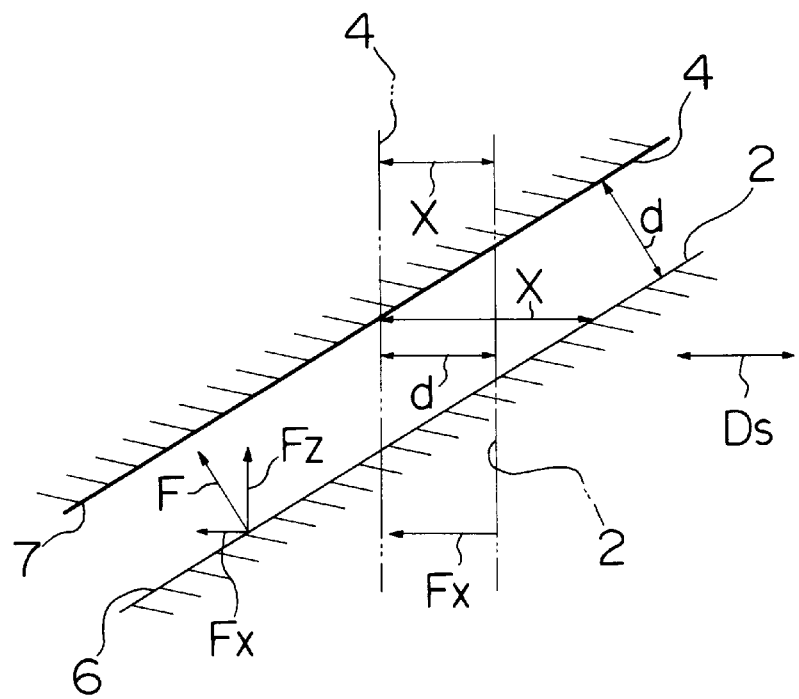
FIG. 7 is a diagram illustrating the principle of the linear motor.

As mentioned previously, the moving-side inclined surface 6 is formed at the front portion of the linear movement body 2, and the moving-side magnetic-pole portions 3sa, 3sb, 3sc . . . are arranged on the moving-side inclined surface 6. The stationary-side inclined surface 7 is formed at the front portion of the stationary body 4 and faces the moving-side inclined surface 6. The stationary-side magnetic-pole portions 5sa, 5sb, 5sc . . . are arranged on the stationary-side inclined surface 7. As a result, as shown in FIG. 7, attractive force F is generated between the linear movement body 2 (moving-side magnetic-pole portions 3sa, 3sb, 3sc, . . . ) and the stationary body 4 (stationary-side magnetic-pole portions 5sa, 5sb, 5sc, . . . ). Attractive force F causes generation, on the linear movement body 2, of thrust Fx greater than torque T generated according to Fleming's rule. When an attractive force is simply to be generated on a magnetic circuit, the linear movement body 2 and the stationary body 4 may be arranged so as to face vertical surface-to-vertical surface with respect to axial direction Ds. In this case, however, moving distance X of the linear movement body 2 becomes too short to be practical. Also, control of thrust Fx becomes very difficult.

In the linear motor L of the drive unit 1 of the present embodiment, moving distance X of the linear movement body 2 is greater than gap d between the moving-side inclined surface 6 and the stationary-side inclined surface 7 (i.e., X>d). Thus, excitation current can be reduced, and a characteristic of thrust Fx can be improved.

Figure 8:
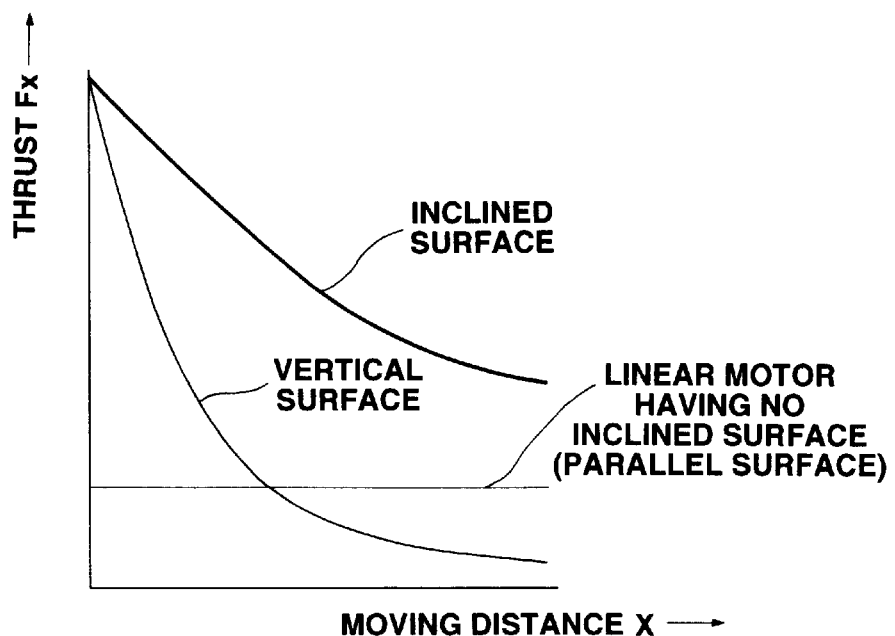
FIG. 8 is a characteristic diagram showing the relationship between axial moving distance and thrust with respect to the linear motor.

FIG. 8 is a characteristic diagram showing the relationship between moving distance X and thrust Fx among the following cases: the linear movement body 2 and the stationary body 4 is arranged so as to face vertical surface-to-vertical surface with respect to axial direction Ds; the inclined surfaces 6 and 7 face each other as in the case of the linear motor L according to the present embodiment; and parallel surfaces are simply provided as in the case of a conventional linear motor. As seen from FIG. 8, in the case where the linear movement body 2 and the stationary body 4 attract each other via the vertical surfaces, thrust Fx decreases abruptly with moving distance X. In the case of the conventional linear motor, thrust Fx is constant irrespective of moving distance X. By contrast, in the case where the inclined surfaces 6 and 7 are employed as in the case of the linear motor L according to the present embodiment, even when moving distance X increases, a reduction in thrust Fx is smaller than in the case where the vertical surfaces are employed. Thrust Fx decreases gently with moving distance X and is sufficiently large as compared to the case of the conventional linear motor. This is because, with a given value of gap d, moving distance X in the case of the inclined surfaces 6 and 7 is longer than that in the case of the vertical surfaces and because an attractive force generated between the linear movement body 2 and the armature and field cores 28 and 42, respectively, is utilized as thrust Fx in contrast to the case of the conventional linear motor where the attractive force is not utilized.

As shown in FIG. 2, hollow space Sr is present within the linear movement portion 2, i.e., within the housing 35. The rotary motor R is disposed within the hollow space Sr. The rotary motor R includes a shaft 51 disposed at the center thereof. A rotor portion (magnet rotor) 52 is provided at an intermediate portion of the shaft 51. A front portion of the shaft 51 is formed into the output shaft 8. The front end of the output shaft 8 projects forward through a front end opening formed in the housing 35 and is connected to the rear end of screw Ks. The front part of the rotor portion 52 is formed into a supported portion 53, and the rear part of the rotor portion 52 is formed into a supported portion 54. The supported portions 53 and 54 are rotatably supported within the housing 35 via bearing mechanisms 55 and 56, respectively. The bearing mechanisms 55 and 56 include thrust bearings 55s and 56s, respectively. The thrust bearings 55s and 56s constitute a pressure endurance mechanism 10 for bearing a pressure that is imposed on the output shaft 8 in axial direction Ds. A stator portion 57 is disposed on the interior surface of the housing 35 in such a manner as to face the rotor portion 52. The stator portion 57 and the rotor portion 52 constitute a three-phase AC servomotor. The stator portion 57 includes a plurality of core portions 57s, which are arranged at predetermined pitches along the interior surface of the housing 35, and stator coils 57c wound on the corresponding core portions 57s. The rotor portion 52 includes a plurality of magnets 52m circumferentially arranged thereon. A rotary encoder 58 for detecting the rotational position (rotational speed) of the shaft 51 is attached to the rear end of the supported portion 54. Cables connected to the stator coils 57c and the rotary encoder 58 are included in the cables 23 and are thus led out to the exterior of the drive unit 1 through the hollow spindle 22. The cables 23 are connected to a controller 19 shown in FIG. 1. Also, the armature coils 30 and the field coils 46 of the linear motor L are connected to the controller 19. Reference numeral 19s in FIG. 1 denotes a setting unit connected to the controller 19. Further, there are provided and connected to the controller 19 unillustrated various sensors, such as a position sensor for detecting position of the screw Ks, a pressure sensor for detecting pressure imposed on the screw Ks, and a speed sensor for detecting an advancing speed of the screw Ks.

Next, the operation of the in-line screw injection molding machine M according to the present embodiment will be described with reference to relevant drawings.

In a measuring step, the rotary motor R is driven so as to rotate the screw Ks via the output shaft 8, thereby plasticizing and measuring a molding material. In this case, the molding material is supplied from the hopper 17 into the heating cylinder 15, while the rotary motor R is driven under control of the controller 19. As measuring proceeds, the screw Ks gradually retreats, and the linear movement body 2 of the linear motor L retreats accordingly. Rotation of the linear movement body 2 is restricted by the rotation-restricting mechanism 9. FIG. 3 shows a state in which the linear movement body 2 is retreated.

In an injection step, the linear motor L is driven so as to linearly move the linear movement body 2, thereby advancing the screw Ks via the output shaft 8. The advancing screw Ks causes the measured, molten resin to be injected and charged into an unillustrated mold through the injection nozzle 16. In the speed control zone where injection and charge is performed, the moving-side magnetic-pole portions 3ha . . . disposed on the moving-side parallel surfaces 38 of the linear movement body 2 and the stationary-side magnetic-pole portions 5ha . . . disposed on the stationary-side parallel surfaces 26 of the stationary body 4 operate dominantly, causing the linear movement body 2 to advance.

The controller 19 performs feedback control over the screw Ks with respect to speed, on the basis of a target screw speed (injection rate) set in the setting unit 19s and a detected speed of the screw Ks obtained from an unillustrated speed sensor. In the pressure control zone where pressure is held, the moving-side magnetic-pole portions 3sa . . . on the moving-side inclined surfaces 6 and the stationary-side magnetic-pole portions 5sa . . . on the stationary-side inclined surfaces 7 operate dominantly, so that a thrust Fx is generated. The controller 19 performs feedback control over the screw Ks with respect to pressure, on the basis of a target holding pressure set in the setting unit 19s and a detected pressure of the screw Ks obtained from an unillustrated pressure sensor. Accordingly, during pressure holding, the generated thrust Fx secures a large holding pressure. During pressure holding, a holding pressure is directly applied to the rotary motor R and is borne by the thrust bearings 55s and 56s of the pressure endurance mechanism 10.

Next, modified embodiments of the present invention will be described with reference to FIGS. 9 to 12.

Figure 9:
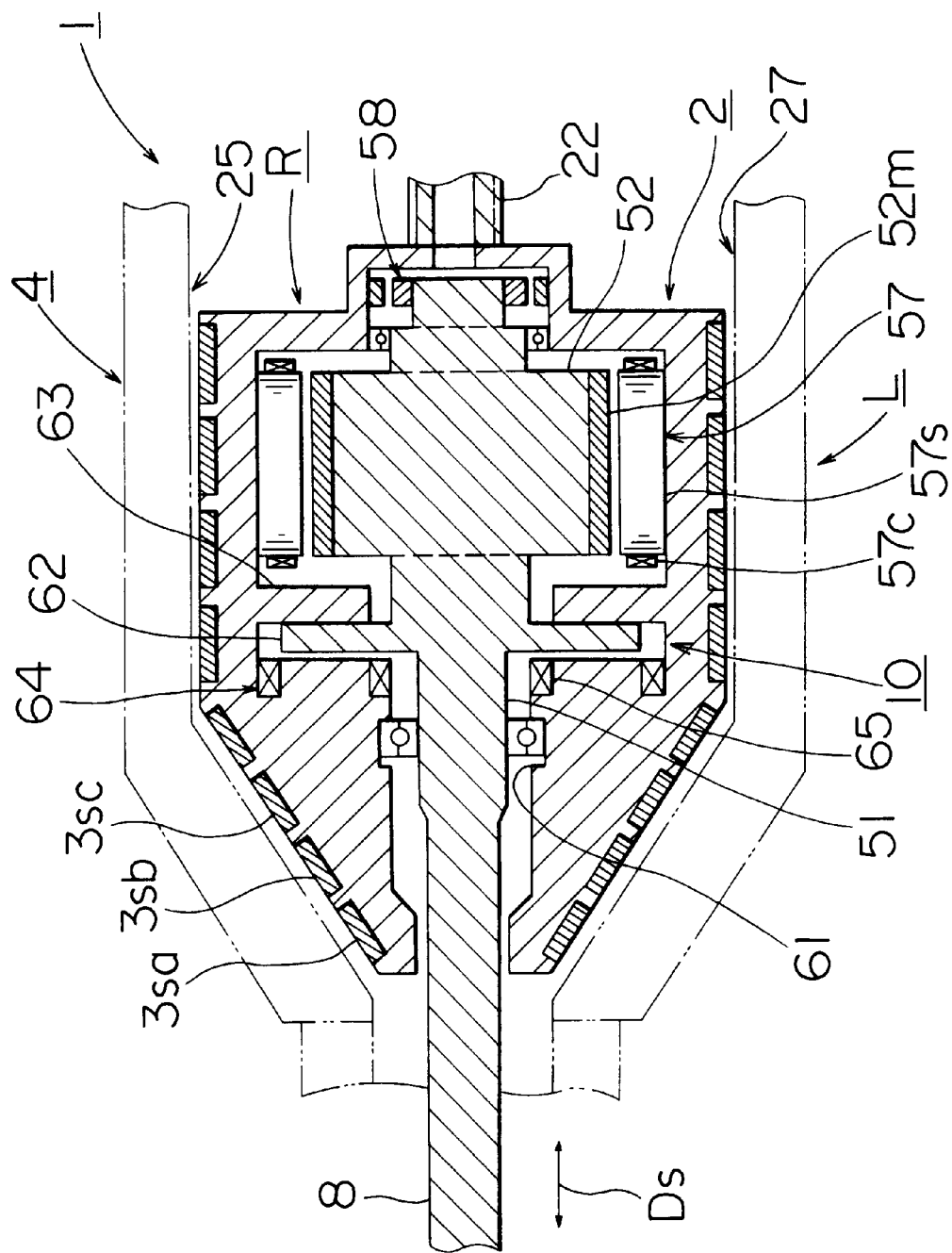
FIG. 9 is a sectional side view showing a portion of a drive unit according to a modified embodiment of the present invention.

FIG. 9 shows a modified embodiment of the pressure endurance mechanism 10 of the rotary motor R. The thrust bearings 55s and 56s of the rotary motor R shown in FIG. 2 bear pressure which is applied to the output shaft 8 in axial direction Ds. In the modified embodiment of FIG. 9, the shaft 51 is accommodated within the housing 35 such that a stopper portion 61 formed within the housing 35 allows the shaft 51 to move by a predetermined distance in an axial direction Ds. A contact plate 62 is integrally provided on a portion of the shaft 51. An engagement portion 63 is integrally provided on the interior surface of the housing 35 and is located behind the contact plate 62. An electromagnet portion 64 is integrally provided within the housing 35 and is located ahead of the contact plate 62. The contact plate 62, the engagement portion 63, and the electromagnet portion 64 constitute the pressure endurance mechanism 10.

In an injection step, pressure (such as holding pressure) is applied backward to the screw Ks. When the shaft 51 moves backward, the contact plate 62 abuts the engagement portion 63, so that backward movement of the shaft 51 is restricted. In this case, since pressure is endured by means of a mechanical contact, not by means of a bearing, a force of about 20 tons can be endured. In a measuring step, the electromagnet portion 64 is excited to thereby attract the contact plate 62 forward such that a gap of about 0.3 mm to 0.5 mm is formed between the contact plate 62 and the electromagnet portion 64, while movement of a radial bearing 65 is restricted by the stopper portion 61 formed within the housing 35. As a result, the contact plate 62 separates from the engagement portion 63, allowing the shaft 51 to rotate. In this case, the relative position of the shaft 51 with respect to the injection nozzle 16 (FIG. 1) is detected and controlled appropriately, so that the rotary motor R can be properly driven. In FIG. 9, the same features as those of FIG. 2 are denoted by common reference numerals for clarification, and detailed description thereof is omitted.

Figure 10:
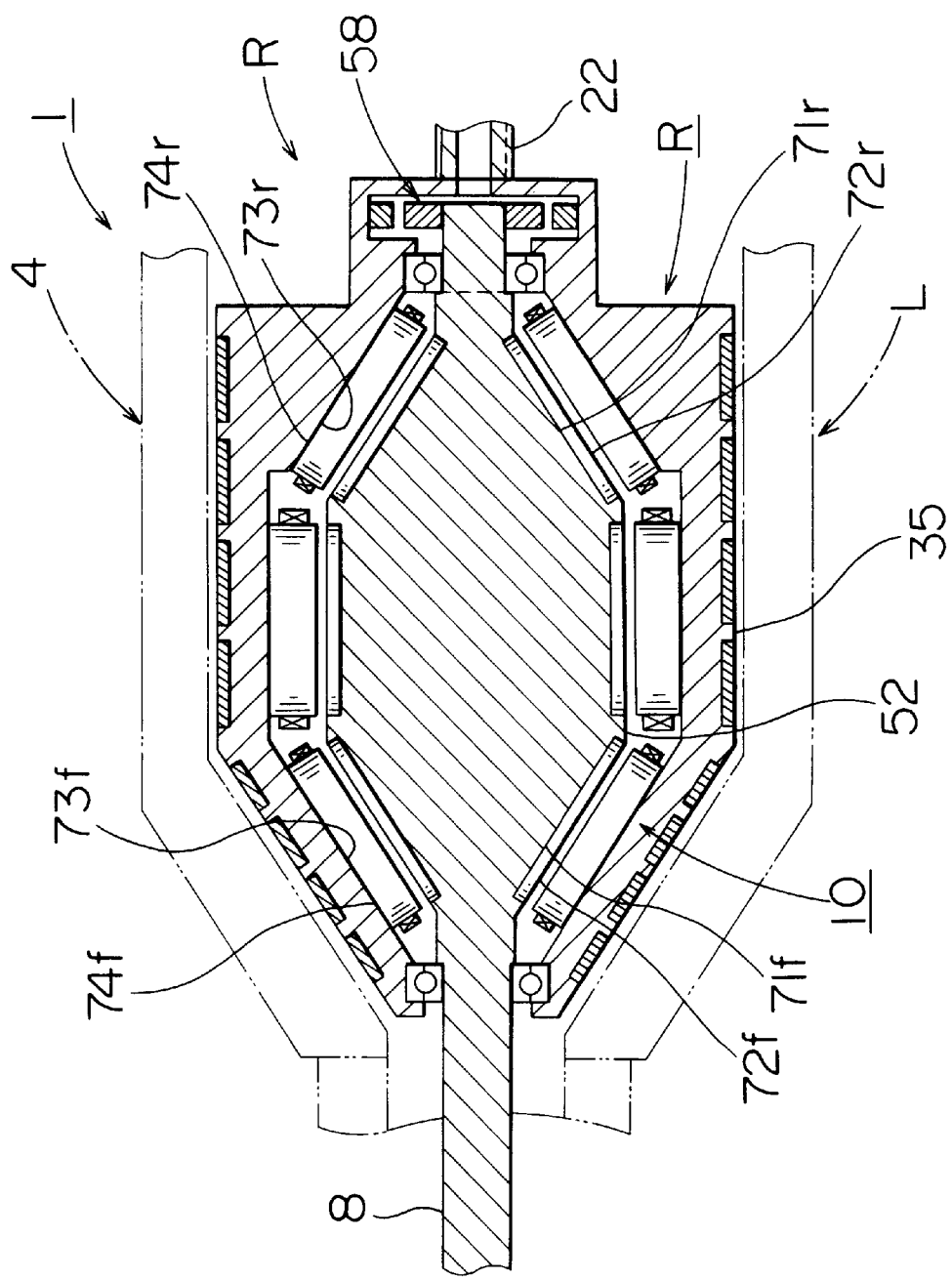
FIG. 10 is a sectional side view showing a portion of a drive unit according to another modified embodiment of the present invention.

FIG. 10 shows another modified embodiment of the pressure endurance mechanism 10, which assumes the form of a magnetic bearing and is configured in the following manner. Front and rear parts of the rotor portion 52 are formed into inclined portions (e.g., tapered portions) 71f and 71r, respectively. Magnetic attraction elements 72f and 72r formed from silicon steel plates are disposed on the inclined portions 71f and 71r, respectively. Inclined portions 73f and 73r are formed on the interior surface of the housing 35 in such a manner as to face the inclined portions 71f and 71r, respectively. Multipolar electromagnets 74f and 74r are disposed on the inclined portions 73f and 73r, respectively. In FIG. 10, the same features as those of FIG. 2 are denoted by common reference numerals for clarification, and detailed description thereof is omitted.

Figure 11:
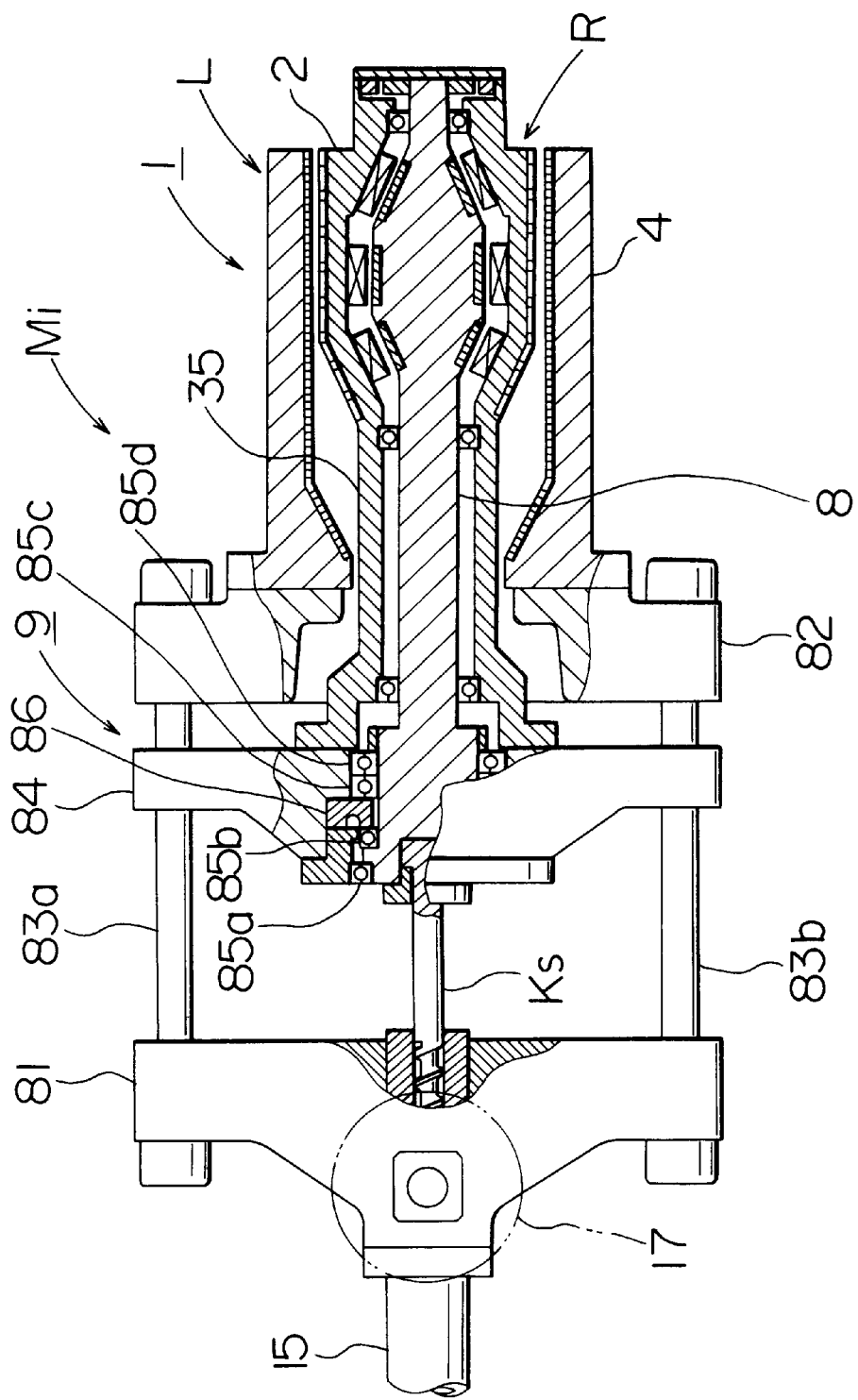
FIG. 11 is a partially sectional plan view of a drive unit according to still another modified embodiment of the present invention.

FIG. 11 shows a modified embodiment of the rotation-restricting mechanism 9 interposed between the linear movement body 2 and the stationary body 4 and adapted to restrict rotation of the linear movement body 2. According to the present modified embodiment, tie bars 83a and 83b extend between a tie bar support 81 attached to the heating cylinder 15 and a tie bar support 82 attached to the casing 20. A slider 84 is slidably mounted on the tie bars 83a and 83b. A tip portion of the output shaft 8 of the drive unit 1 is attached to the slider 84 in such a manner as to be rotatable via bearings 85a, 85b, 85c, and 85d disposed on the outer circumferential surface thereof. A pressure sensor 86, such as a load cell, is interposed between the tip portion of the output shaft 8 and the slider 84. The tip end face of the output shaft 8 is connected to the rear end of the screw Ks. The tip of the housing 35 extends forward and is connected to the rear end face of the slider 84. Thus is configured the rotation-restricting mechanism 9 for restricting rotation of the linear movement body 2 relative to the stationary body 4. The pressure sensor 86 detects pressure applied to the screw Ks in axial direction Ds. In FIG. 11, the same features as those of FIGS. 1 and 2 are denoted by common reference numerals for clarification, and detailed description thereof is omitted.

Figure 12:
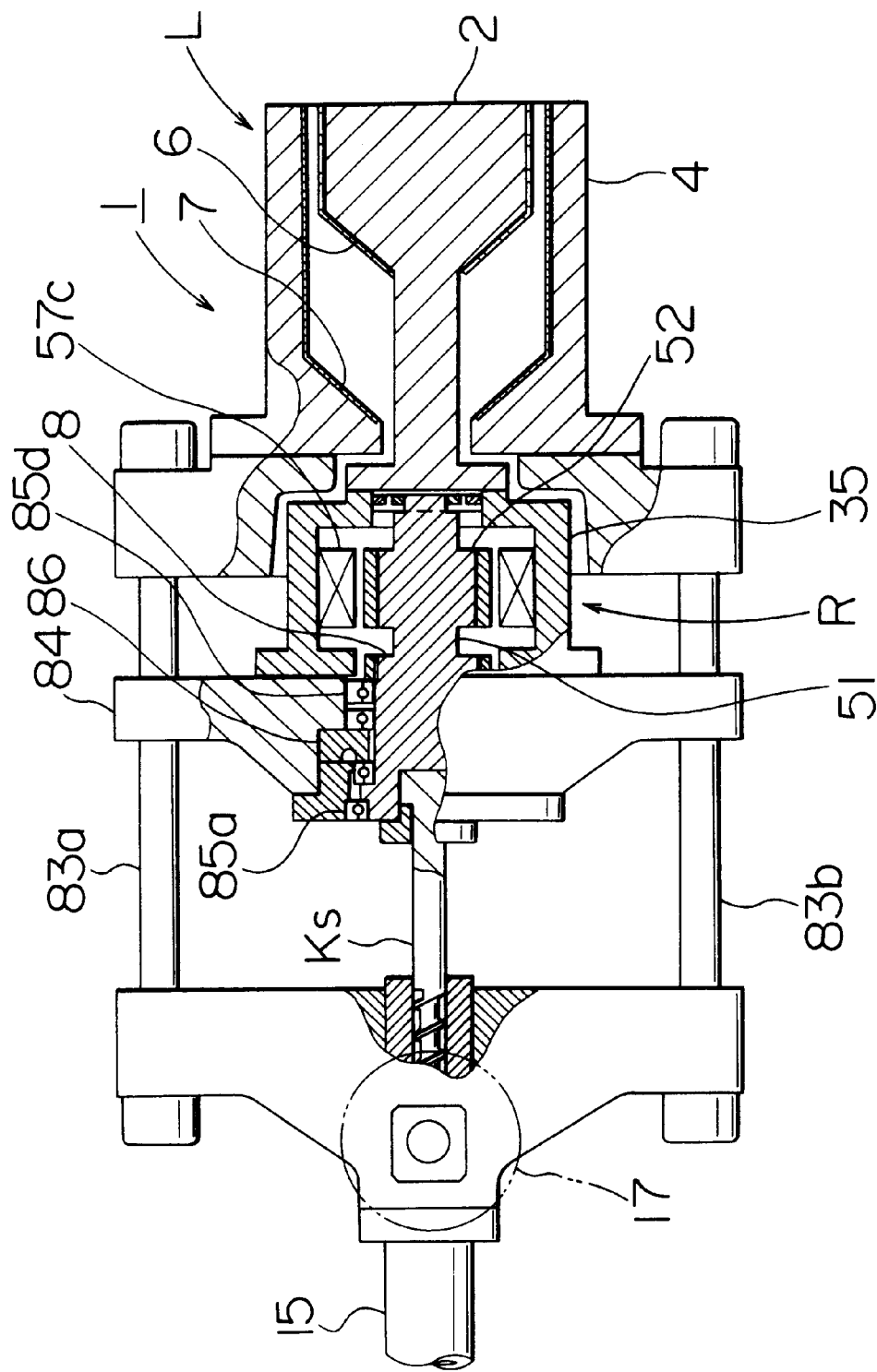
FIG. 12 is a partially sectional plan view of a drive unit according to a further modified embodiment of the present invention.

FIG. 12 shows a further modified embodiment of the present invention in which the rotary motor R is disposed outside the linear movement body 2 and is integrally connected to the linear movement body 2. According to the present modified embodiment, the housing 35 is integrally attached to the rear end face of the slider 84, while the front end of the linear movement body 2 is connected to the rear end of the housing 35. The rotary motor R is disposed within the housing 35. The output shaft 8 (shaft 51) projects forward through a front end opening of the housing 35. A tip portion of the output shaft 8 is attached to the slider 84 in such a manner as to be rotatable via the bearings 85a, 85b, 85c, and 85d disposed on the outer circumferential surface thereof. In FIG. 12, the same features as those of FIGS. 2 and 11 are denoted by common reference numerals for clarification, and detailed description thereof is omitted.

The present invention is not limited to the above-described embodiments. Regarding structural details, shape, and any other features, modifications and any omission or addition may be possible as needed without departing from the scope of the invention.

For example, the linear motor L of FIG. 2 is described while mentioning two pairs of armature cores 28 and two pairs of field cores 42 provide around the linear movement body 2. However, the number of armature cores 28 and the number of field cores 42 are not particularly limited. For example, two field cores 42 may be combined with a single armature core 28; a single field core 42 may be combined with two armature cores 28; and three or more armature cores 28 may be combined with three or more field cores 42. The configuration of the rotation-restricting mechanism 9, the pressure endurance mechanism 10, or the rotary motor R is not particularly limited, but may be modified in various ways. The above embodiments are described while mentioning the inclined surfaces 6 and 7 formed at a front portion of the linear motor L. However, the inclined surfaces 6 and 7 may be formed at a rear or intermediate portion of the linear motor L. The configuration of the linear motor L and that of the rotary motor R are not particularly limited, but may be modified in various ways. For example, the linear motor L and the rotary motor R are described while mentioning the linear movement boy 2 of square cross section and the stationary body 4 of square cross section. However, the linear movement body 2 and the stationary body 4 may assume a polygonal or circular section. For example, in the case of the stationary body 4 of circular section, the armature portions 25 . . . and the field-generating portions 41 . . . each assume quadrantal section. The magnetic elements 36a . . . disposed on the linear movement body 2 may be replaced by magnets. In this case, the field-generating portions of the embodiment shown in FIG. 5 become unnecessary, so that the armature portions 25 . . . can be formed on all of the upper, lower, left-hand, and right-hand sides of the casing 20. Further, a plurality of drive units 1 may be connected together while sharing the same shaft 51. Torque (pressure) increases with the number of the drive units 1 connected. By selecting an angle of inclination of the inclined surfaces 6 and 7, the magnitude (rate of change) of thrust Fx with respect to moving distance X of the movable body K can be modified accordingly. Herein, the terms "moving-side" and "stationary-side" refer to a relative concept. A "moving-side" element may be stationary, and a "stationary-side" element may be movable. For example, the output shaft may be connected to the stationary body. Such a modification may also be included in the scope of the invention. Also, the injection molding machine M is described while mentioning the screw Ks disposed within the injection apparatus Mi and serving as the movable body K. However, the movable body K is not particularly limited, but may assume various forms that rotate and move linearly, such as a screw disposed within a heating cylinder of a plasticizing apparatus of a preplasticization injection molding machine, wherein a valve portion for opening and closing a resin passage of the heating cylinder is provided at the tip end of the screw, or a mold exchange rotary table for supporting a plurality of molds.

What is claimed is:

1. A molding machine including a movable body and a drive unit for rotating and linearly moving the movable body, said drive unit comprising:

a linear motor comprising a linear movement body having a moving-side magnetic-pole portion and supported in an axially movable manner, and a stationary body having a stationary-side magnetic-pole portion adapted to linearly move the linear movement body; and a rotary motor incorporated into the linear movement body and adapted to rotate an output shaft connected to the movable body, wherein the linear movement body has a moving-side inclined surface on which part of the moving-side magnetic-pole portion is disposed, and the stationary body has a stationary-side inclined surface which faces the moving-side inclined surface and on which part of the stationary-side magnetic-pole portion is disposed.

2. A molding machine according to claim 1, wherein a rotation-restricting mechanism for restricting rotation of the linear movement body is provided between the linear movement body and the stationary body.

3. A molding machine according to claim 1, wherein the stationary body comprises a casing assuming a tubular shape of square cross section, and a front portion of the casing is reduced in size toward a front end thereof to form a tetragonal pyramid.

4. A molding machine according to claim 3, wherein the stationary body has an armature portion serving as the stationary-side magnetic-pole portion on each of two opposed interior surfaces of the casing.

5. A molding machine according to claim 3, wherein the stationary body has a field-generating portion on each of two other opposed interior surfaces of the casing, the field-generating portion being adapted to generate the moving-side magnetic-pole portion through magnetization of the linear movement body.

6. A molding machine according to claim 1, wherein the linear movement body comprises a housing assuming a tubular shape of square cross section, and a front portion of the housing is reduced in size toward a front end thereof to form a tetragonal pyramid, and magnetic elements are arranged at predetermined intervals on an outer surface of the casing.

7. A molding machine according to claim 1, wherein the rotary motor comprises a pressure endurance mechanism for enduring pressure applied axially to the output shaft.

8. A molding machine according to claim 7, wherein the pressure endurance mechanism comprises a thrust bearing for supporting a shaft of the rotary motor.

9. A molding machine according to claim 7, wherein the pressure endurance mechanism comprises a stopper portion formed on the housing and adapted to allow the shaft to axially move by a predetermined distance; a contact plate provided integrally on a portion of the shaft; an engagement portion provided integrally on an interior surface of the housing and located behind the contact plate; and an electromagnet portion provided integrally within the housing and located ahead of the contact plate.

10. A molding machine according to claim 7, wherein the pressure endurance mechanism comprises a magnetic bearing which, in turn, comprises inclined portions formed at front and rear parts of a rotor portion of the rotary motor; magnetic attraction elements disposed on the inclined portions; inclined portions formed on an interior surface of the housing in such a manner as to face the inclined portions of the rotary motor; and multipolar electromagnets disposed on the inclined portions of the housing.

11. A molding machine according to claim 1, wherein the rotary motor is disposed within a hollow space formed within the linear movement body.

12. A molding machine according to claim 1, wherein the rotary motor is disposed outside the linear movement body and is integrally connected to the linear movement body.

13. A molding machine according to claim 1, wherein the movable body is a screw disposed within an injection apparatus of an injection molding machine.

* * * * *

UNITED STATES PATENT AND TRADEMARK OFFICE
CERTIFICATE OF CORRECTION

PATENT NO.   : 6,051,896
DATED        : April 18, 2000
INVENTOR(S)  : Shibuya et al.

It is certified that error appears in the above-identified patent and that said Letters Patent is hereby corrected as shown below:

On the title page, in item "[73] Assignees:" please change the second listed assignee from "Misso Electric Company" to -- Nisso Electric Company --.

Signed and Sealed this

Seventeenth Day of April, 2001

Attest:

NICHOLAS P. GODICI

Attesting Officer

Acting Director of the United States Patent and Trademark Office